W. R. MONTGOMERY.
CHAIN TIGHTENER.
APPLICATION FILED FEB. 16, 1921.
1,405,615.
Patented Feb. 7, 1922.
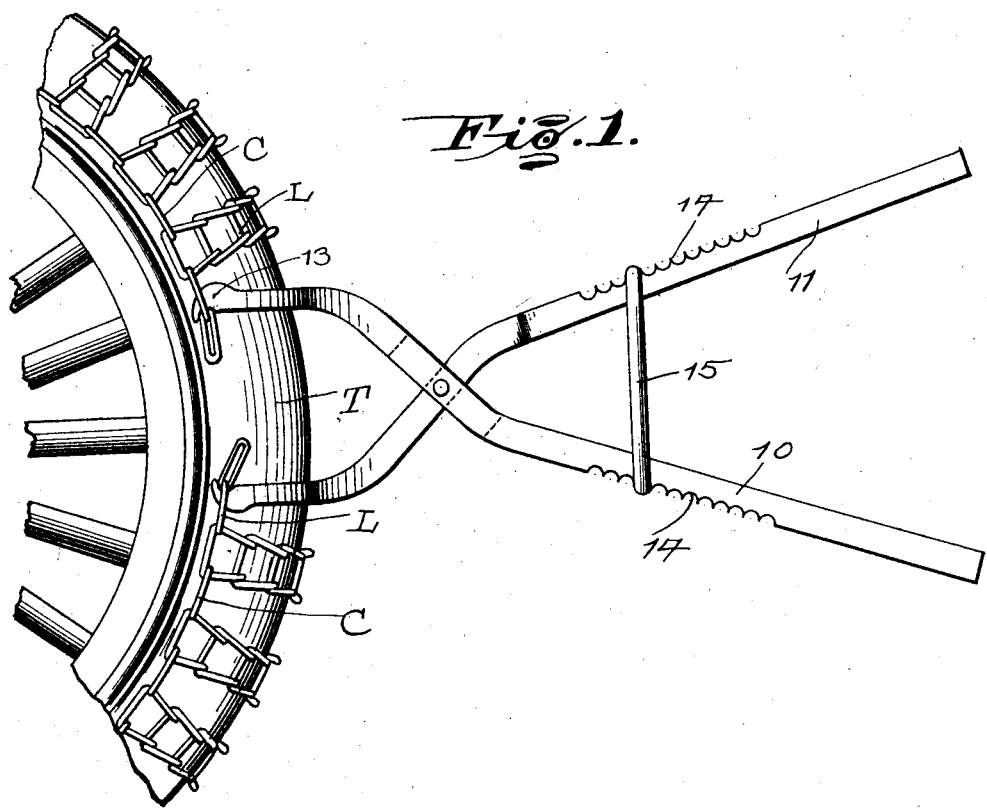
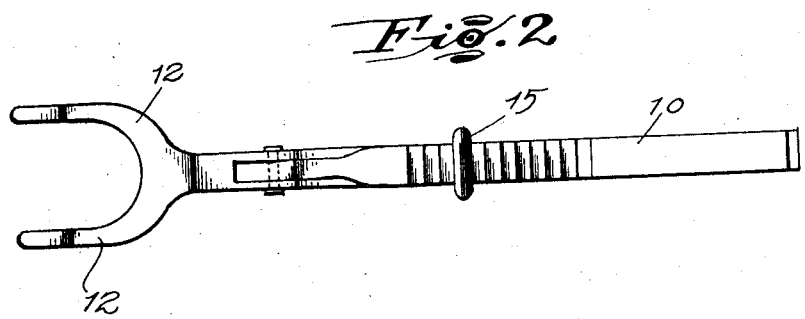
WALTER R. MONTGOMERY. INVENTOR.
BY Watson E. Coleman ATTORNEY.

UNITED STATES PATENT OFFICE.

WALTER R. MONTGOMERY, OF BELPRE, KANSAS.

CHAIN TIGHTENER.

1,405,615.  Specification of Letters Patent.  Patented Feb. 7, 1922.

Application filed February 16, 1921. Serial No. 445,431.

*To all whom it may concern:*

Be it known that I, WALTER R. MONTGOMERY, a citizen of the United States, residing at Belpre, in the county of Edwards and State of Kansas, have invented certain new and useful Improvements in Chain Tighteners, of which the following is a specification, reference being had to the accompanying drawings.

This invention relates to improvements in chain tighteners, and more particularly to a chain tightener adapted for tightening the annular connecting chains of automobile anti-skid devices.

An important object of the invention is to provide a device of this character which will simultaneously tighten the annular chains at opposite sides of a tire, thereby eliminating the common error in applying chains of tightening one side to such an extent that the annular chain at the opposite side of the tire is disposed too closely to the periphery.

A further object of the invention is to provide a device of this character which may be employed for engaging the chains and tightening the same and which, after the chains have been tightened to the desired extent may be locked against movement in order that the operator may have both hands free to connect the ends of the chains.

Other objects and advantages of the invention will become apparent throughout the course of the following description.

In the accompanying drawings wherein for the purpose of illustration is shown a preferred embodiment of my invention and wherein like reference characters designate like parts throughout, Figure 1 is a side elevation of a fragment of an automobile wheel showing a chain tightener constructed in accordance with my invention applied thereto to tighten the chains, Figure 2 is a side elevation of the chain tightener detached.

Referring now more particularly to the drawings, the numerals 10 and 11 indicate a pair of plier members pivotally connected as is usual, and having their operating ends furcated to form spaced arms 12 adapted to receive therebetween a tire T. Each of the ends of the arms 12 is provided with a hook portion 13 adapted to engage in a link L of the chain C, the hook portions being each directed toward the hook portion of the corresponding arm of the other of the plier members. The handle portions of the plier members 10 and 11 are each notched, as at 14, for the reception of the cross bar 15 of a link 16.

In the use of my device the same is applied to the tire so that the arms 12 of each of the operating ends is arranged upon opposite sides of the tire and the hooks 13 of the arms 12 are engaged in an end link or link adjacent the end of the annular chains of the anti-skid member. The handle portions of the plier members are then engaged to force the ends of the chains together so that the chain is tightened, and when the desired degree of tightness has been attained in the chains the link 16 is shifted to hold the plier members in their adjusted position. As the chains will be under considerable strain at this time, they will hold the implement without the necessity of the same being supported by the operator, and the hands of the operator are accordingly left free to connect the ends of the chains.

From the foregoing it is believed to be obvious that I have constructed a chain tightener for tightening the annular chains of anti-skid devices for automobile wheels which is particularly well adapted for use in this connection by reason of the fact that it simultaneously tightens the chains, thereby allowing of uniform tightening of the chains on each side and preventing one of the chains from being tightened to too great an extent. It will furthermore be obvious that the construction of the same, as hereinbefore set forth, is capable of some change in modification without departing from the spirit of my invention, and I accordingly do not limit myself to such specific structure except as hereinbefore claimed.

What I claim is:

1. A chain tightener for tightening the annular chains of automobile anti-skid devices, comprising a pair of plier members each provided upon the operating end thereof with spaced arms each adapted for the engagement with a link of an annular chain at one side of a tire.

2. A chain tightener for tightening the annular chains of automobile anti-skid devices, comprising a pair of plier members each provided upon the operating end thereof with spaced arms each adapted for the engagement with a link of an annular chain at one side of a tire, and means for locking the plier members in adjusted position.

3. In a chain tightener for tightening the annular chains of automobile anti-skid devices, a pair of pivotally connected plier members each having the operating end thereof furcated to form spaced arms adapted to be arranged upon opposite sides of the tire, a hook formed upon the extremity of each of said arms and adapted to engage in a link, the hook member of each of said arms being directed toward the hook member of the corresponding arm of the other of said plier members.

4. In a chain tightener for tightening the annular chains of automobile anti-skid devices, a pair of pivotally connected plier members each having the operating end thereof furcated to form spaced arms adapted to be arranged upon opposite sides of the tire, a hook formed upon the extremity of each of said arms and adapted to engage in a link, the hook member of each of said arms being directed toward the hook member of the corresponding arm of the other of said plier members, the operating ends of said plier members having their outer faces notched and a link adapted to interchangeably engage in the notches to hold the plier members in adjusted position.

In testimony whereof I hereunto affix my signature.

WALTER R. MONTGOMERY.